United States Patent [19]

Gerbi et al.

[11] Patent Number: 4,756,598
[45] Date of Patent: Jul. 12, 1988

[54] SECOND HARMONIC GENERATION WITH 5-CHLORO-2-NITROANILINE

[75] Inventors: Diana J. Gerbi; Peter C. Leung; John J. Stofko, Jr., all of St. Paul, Minn.

[73] Assignee: Minnesota Mining and Manufacturing Company, St. Paul, Minn.

[21] Appl. No.: 84,876

[22] Filed: Aug. 13, 1987

[51] Int. Cl.⁴ .............................................. G02F 1/37
[52] U.S. Cl. ............................... 350/96.29; 307/427; 350/96.34
[58] Field of Search ........................ 307/425–430; 350/96.10, 96.12–96.15, 96.29, 96.30, 96.34

[56] References Cited

U.S. PATENT DOCUMENTS

| | | | |
|---|---|---|---|
| 3,395,329 | 7/1968 | Rentzepis | 307/427 |
| 3,431,484 | 3/1969 | Pao et al. | 307/427 |
| 3,858,124 | 12/1974 | Bass et al. | 332/7.51 |
| 4,199,698 | 4/1980 | Bethea et al. | 307/425 |
| 4,208,501 | 6/1980 | Yee et al. | 526/259 |
| 4,376,899 | 3/1983 | Chemla et al. | 307/425 |
| 4,431,263 | 2/1984 | Garito | 350/96.34 |
| 4,579,915 | 4/1986 | Choe | 525/435 |
| 4,605,869 | 8/1986 | Choe | 307/425 |
| 4,607,095 | 8/1986 | Kuder | 528/337 |
| 4,622,409 | 11/1986 | Nicoud et al. | 307/425 X |

OTHER PUBLICATIONS

Howard, J. C., Org. Syn, IV, Dec. 1963, pp. 42–45, "2-Amino-3-Nitrotoluene".
Kurtz et al., J. Appl. Phys. Jul. 1968, vol. 39, No. 8, 3798–3813, "A Powder Technique for . . .".
Mayes, H. A. and Turner, E. E., J. Chem. Soc., Feb. 1928, pp. 691–697, "The Nitration of . . .".
Stout, G. H., and Jense, L. H., "X-Ray Structure Determination", MacMillan Publishing Co., Inc.: 1968.

Primary Examiner—John Lee
Attorney, Agent, or Firm—Donald M. Sell; James A. Smith; David W. Anderson

[57] ABSTRACT

Devices for and method of generating coherent second harmonic light radiation. The devices comprise a laser source of coherent light radiation at a fixed fundamental frequency, crystalline 5-chloro-2-nitroaniline that crystallizes in a non-centrosymmetric configuration, means for directing the output radiation of the laser onto the 5-chloro-2-nitroanilane, and output means for utilizing the second harmonic frequency.

5 Claims, 1 Drawing Sheet

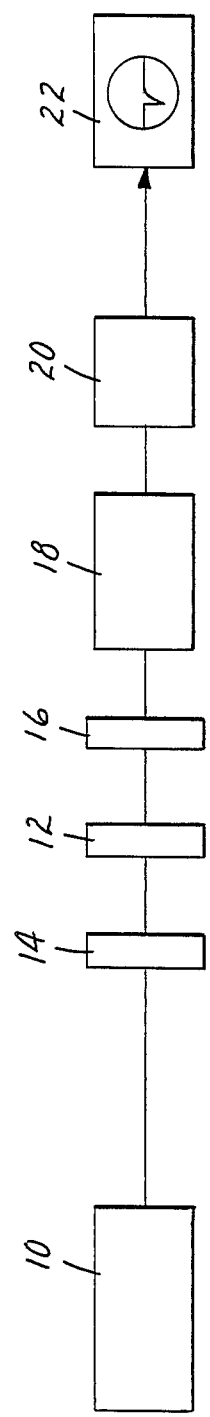

SECOND HARMONIC GENERATION WITH 5-CHLORO-2-NITROANILINE

BACKGROUND OF THE INVENTION

1. Technical field

This invention is concerned with materials for nonlinear optical devices for the conversion of optical energy at one frequency to optical energy at another frequency.

2. Discussion of the prior art

Laser techniques have been developed so that it is possible to obtain a limited number of fundamental frequencies of coherent laser light by utilizing solid, gas, and liquid media. However, in many applications, laser light having frequencies not among the fundamental frequencies obtainable is required, and in some cases laser light exhibiting a continuous spectrum over a certain range of frequencies is required. Nonlinear optical crystals have, therefore, frequently been employed to convert coherent laser light of a fundamental frequency into laser light of the second harmonic, that is to say, laser light with a frequency twice the fundamental frequency.

In the prior art, monocrystalline forms of inorganic materials such as potassium dihydrogen phosphate (KDP), ammonium dihydrogen phosphate (ADP), barium sodium niobate (BaNaNbO3), and lithium niobate (LiNbO3) have been used for generating higher frequency harmonics. Monocrystalline KDP and ADP, while offering greater resistance to optical irradiation induced surface damage due to laser beam bombardment, do not exhibit large optical nonlinearities, thereby rendering these crystals unfavorable for higher harmonic frequency generation or conversion. In contrast, BaNaNbO₃, and LiNbO₃ show large nonlinearities but, unfortunately, a low resistance to optical damage. In this regard, the term "resistance to optical damage" means the number of times the surface of a crystalline material can be bombarded (shots) with laser radiation of a given power density in watts per unit area before the subject crystal shows signs of opacity. Thus, a crystal showing high resistance can sustain a larger number of shots than a crystal of low resistance for the same power density of the incident laser beams.

Use of organic molecules in nonlinear optical devices has generated much interest recently because a large number of molecules are available for investigation. Some substituted aromatic molecules are known to exhibit large optical nonlinearities. The possibility of such an aromatic molecule having large optical nonlinearities is enhanced if the molecule has electron donor and acceptor groups bonded to the conjugated system of the molecule. The potential utility for very high frequency application of organic materials having large second-order and third-order nonlinearities is greater than that for conventional inorganic electro-optic materials because of the bandwidth limitations of inorganic materials. Furthermore, the properties of organic materials can be varied to optimize mechanical and thermo-oxidative stability and laser damage threshold.

U.S. Pat. No. 4,199,698 discloses that the nonlinear optical properties of 2-methyl-4-nitroaniline (MNA) make it a highly useful material in nonlinear devices that convert coherent optical radiation including a first frequency into coherent optical radiation including a second frequency. The nonlinear devices have means for introducing coherent radiation of a first frequency into the MNA and means for utilizing coherent radiation emitted from the MNA at a second frequency.

Diacetylenes and polymers formed from diacetylenic species, which are amenable to close geometric, steric, structural, and electronic control, provide nonlinear optic, waveguide, piezoelectric, and pyroelectric materials and devices. Diacetylenes which are crystallizable into crystals having a noncentrosymmetric unit cell may be elaborated into a thin film upon a substrate by the Langmuir-Blodgett technique. Such films may be polymerized either thermally or by irradiation for use in nonlinear optical systems. Diacetylenes are covalently bonded to substrates through the employment of silane species and subsequently polymerized to yield nonlinear optic devices having high structural integrity in addition to high efficiencies and optical effects. U.S. Patents relating to these acetylenic materials include U.S. Pat. Nos. 4,605,869 and 4,431,263.

U.S. patents relating to non-linear optical properties of organic materials include U.S. Pat. Nos. 4,208,501; 4,376,899; 4,579,915; and 4,607,095.

DESCRIPTION OF THE DRAWING

FIG. 1 is a diagrammatic representation of a device capable of generating coherent second harmonic light radiation with 5-chloro-2-nitroaniline.

SUMMARY OF THE INVENTION

The present invention provides a laser generator of coherent second harmonic light radiation by utilizing 5-chloro-2-nitroaniline and a method of generating coherent second harmonic light radiation with such a device.

In general, second harmonic generators of this invention comprise, in combination, a laser source of coherent light radiation at a fixed fundamental frequency, 5-chloro-2-nitroaniline as the second harmonic generator, a means for directing the output radiation of the laser onto the organic molecular crystalline 5-chloro-2-nitroaniline, and output means for utilizing the second harmonic frequency.

DETAILED DESCRIPTION

5-Chloro-2-nitroaniline suitable for use in the present invention is crystalline in form, and is preferably in solid crystalline form. Three crystal structures or polymorphs have been identified by X-ray powder diffraction. One crystal structure of 5-chloro-2-nitroaniline that has been found to exhibit second harmonic generation shows it to belong to the noncentrosymmetric space group Pna2₁, i.e. it crystallizes in a noncentrosymmetric configuration (see Stout, G. H. and Jensen, L. H., "X-Ray Structure Determination," Macmillan Publishing Co., Inc.: 1968, for a discussion on crystal structure analysis). Non-centrosymmetric species are those which have no center of symmetry on either the molecular or crystalline unit cell level.

5-Chloro-2-nitroaniline is substantially transparent to electromagnetic radiation having wavelengths from 400–500 nm to 1000–1100 nm. Accordingly, the compound is useful in second harmonic generators wherein both incident radiation and emergent radiation range from 500 nm to 1064 nm.

5-Chloro-2-nitroaniline is commercially available from Aldrich Chemical Co., Inc., Milwaukee, WI. However, the commercial material is generally not the active form thereof, and it must be recrystallized from ethanol to obtain the form which exhibits second harmonic generation. Alternatively, 5-chloro-2-nitroaniline can be synthesized by the acylation and nitration of 3-chloroaniline, followed by hydrolysis and separation of the resultant chloronitroaniliner isomers, 5-chloro-2-nitroaniline and 3-chloro-4-nitroaniline following an acylation, nitration, and hydrolysis scheme similar to that described in Howard, J. C., Org. Syn., IV 1963, 42–45.

Devices that are capable of generating coherent second harmonic light radiation with 5-chloro-2-nitroaniline described herein are well known in the art. Representative examples of such devices are described in U.S. Pat. Nos. 3,395,329; 3,431,484; and 3,858,124; and U.S. patent application Ser. Nos. 925,300 (now U.S. Pat. No. 4,714,838) and 937,234; all of which are incorporated herein by reference for the purpose of describing devices which can incorporate the 5-chloro-2-nitroaniline described herein and exhibit second harmonic generation.

Advantages of this invention are further illustrated by the following examples, but the particular materials and amounts thereof recited in these examples, as well as other conditions and details, should not be construed to unduly limit this invention.

Parts and percentages are by weight unless otherwise indicated. All of the compounds prepared in the examples and comparative examples were characterized by conventional analytical techniques, e.g. infrared spectroscopy, ultraviolet/visible absorption spectroscopy, nuclear magnetic resonance spectroscopy, melting point, elemental analysis, X-ray powder diffraction and X-ray diffraction single crystal measurements.

Crystals were evaluated for second harmonic generation efficiency using the second harmonic generation (SHG) powder test described in Kurtz et al., J. Appl. Phys. 1968, 39, 3798. The sample was ground and sieved and then mixed with a liquid of chosen refractive index to minimize beam scatter caused by the differences in the index of refraction between the particles and the ambient atmosphere (index-matching). The index-matched sample was placed between cell flats spaced 0.35±0.02 mm apart. Particles having mean diameters greater than 90 micrometers but less than 180 micrometers were used. The particles of optimum size were obtained by sieving through appropriate mesh screens. Each sample was mixed with a drop of index matching fluid having a refractive index of 1.63 (R. P. Cargille, Cedar Grove, N.J.). The samples were not index matched critically, so that the actual SHG efficiencies may be higher than that reported in the example.

Referring now to FIG. 1, infrared radiation at 1064 nm from a Q-switched Nd-YAG laser 10 was weakly focused onto cell 12 containing the prepared sample. In the device illustrated in FIg. 1, the means for directing the output radiation of the laser, e.g. a lens, first through a filter 14 (Corning CS2-60 color filter used to block any radiation at 532 nm) and then onto cell 12 containing the 5-chloro-2-nitroaniline containing sample was integrated into the laser 10 and is not shown as a separate component. Means for directing the output radiation of the laser onto the organic molecular crystalline compound are well-known to one of ordinary skill in the art. An infrared blocking filter 16 placed behind the sample allowed only the second harmonic frequency generation to pass through a ⅛ meter monochrometer 18 tuned at 532 nm. Output of the monochrometer 18 was directed to a photomultiplier tube 20, and the resulting signal was processed by a boxcar averager 22 that averages signals over many laser pulses.

Urea was the chosen standard because of its high second order coefficient and its availability. The urea standard was prepared in the same manner as the samples. The urea standard was indexed matched reasonably well with the index matching fluid, with a mismatch of about 0.01. The reported efficiency of a sample is its SHG signal normalized to that of the urea standard measured under the same experimental conditions.

EXAMPLES

Example 1

A mixture containing 125 ml of 3-chloroaniline and 500 ml of glacial acetic acid was refluxed for 4 hours. After the mixture was cooled to 95° C., 600 ml of water was added to precipitate the crude 3-chloroacetanilide. The 3-chloroacetanilide crystals were collected by filtration and then refluxed in 550 ml of toluene. After the water was removed as an azeotrope with toluene through the use of a Dean Stark water trap, 550 ml of cyclohexane was added to precipitate 3-chloroacetanilide, which was then filtered, collected and dried (see Beilstein, F. and Kurbatow, S., Annalen 1876, 182, 94).

To a mixture containing 30 ml of glacial acetic acid and 55 ml of concentrated sulfuric acid maintained at 10° C. with stirring were added 33 g of 3-chloroacetanilide in one portion and 20 ml of fuming nitric acid from a dropping funnel. The resulting mixture was poured over ice and a precipitate containing the isomers 5-chloro-2-nitroacetanilide and 3-chloro-4-nitroacetanilide was filtered, collected, and dried in a vacuum oven (see Mayes, H. A. and Turner, E. E., J. Chem. Soc. 1928, 691).

Hydrolysis of the isomeric chloroacetanilides was carried out by adding the mixtures collected in the previous step to 60% sulfuric acid and maintaining the temperature at 100° C. for 1 hour. The resultant solution was added to an excess of water to precipitate a product consisting of the isomers 5-chloro-2-nitroaniline and 3-chloro-4-nitroaniline (see Mayes, H. A. and Turner, E. E., J. Chem. Soc. 1928, 691).

The isomers from the previous step were separated by extraction with two 80 ml portions of chloroform. The 5-chloro-2-nitroaniline, which was more soluble, was recovered from the chloroform solution by evaporation of the chloroform, and the residue recrystallized several times from ethanol to give a product which exhibited second harmonic generation.

Sieved particles of 5-chloro-2-nitroaniline having diameters between 90 and 180 micrometers were mixed with an index-matching fluid having a refractive index of 1.63 and placed between cell flats spaced 0.35±0.02 mm apart to determine the SHG efficiency.

Second harmonic generation measurements of 5-chloro-2-nitroaniline show an efficiency value of 20 relative to urea.

The crystal structure of the active form of 5-chloro-2-nitroaniline was determined using a ENRAF-NONIUS (Bohemia, N.Y.) CAD4 Automatic diffractometer with Mo K-alpha radiation.

COMPARATIVE EXAMPLES

The compounds listed below in Table I were prepared in substantially the same manner as was the compound of Example 1. The compounds were recrystallized from ethanol. The compounds were evaluated for SHG in the same manner as was the compound of Example 1.

TABLE I

| Example no. | Compound | SHG efficiency |
| --- | --- | --- |
| 1 | 5-chloro-2-nitroaniline | 20 |
| A (comp.) | 5-chloro-4-nitroaniline | ≦0.001 |
| B (comp.) | 5-nitro-2-chloroaniline | ≦0.001 |
| C (comp.) | 4-nitro-2-chloroaniline | 2 |
| D (comp.) | 4-chloro-2-nitroaniline | 0.03 |
| E (comp.) | 4-chloro-3-nitroaniline | ≦0.001 |
| F (comp.) | 5-bromo-2-nitroaniline | ≦0.001 |
| G (comp.) | 5-fluoro-2-nitroaniline | ≦0.001 |
| H (comp.) | 5-trifluoromethyl-2-nitroaniline | ≦0.001 |

The data in the foregoing table show that of numerous species of anilines containing both nitro (—NO$_2$) and halo (—F, —Cl, —Br) or halo-substituted alkyl substituents, only the 5-chloro-2-nitroaniline species demonstrates an unexpectedly high SHG efficiency.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A second harmonic generator comprising a laser source of coherent light radiation at a fixed fundamental frequency, an organic molecular crystalline compound, means for directing the output radiation of the laser onto the compound, and output means for utilizing the second harmonic frequency, said compound being 5-chloro-2-nitroaniline which crystallizes in a non-centrosymmetric configuration, said compound being transparent to radiation at said fixed fundamental frequency and said second harmonic frequency.

2. The second harmonic generator of claim 1 wherein said organic molecular crystalline compound has the noncentrosymmetric space group Pna2$_1$.

3. The second harmonic generator of claim 1 wherein the laser is a Nd-YAG laser.

4. The second harmonic generator of claim 1 wherein said compound is a solid.

5. A process for converting a fixed fundamental frequency of coherent laser light into a second harmonic frequency which comprises passing said laser light through a nonlinear optical element comprising an organic molecular crystalline compound, said compound being 5-chloro-2-nitroaniline which crystallizes in a non-centrosymmetric configuration, said compound being transparent to said fixed fundamental frequency and to said second harmonic frequency.

* * * * *